A. W. MEDHURST.
MOTOR VEHICLE FRAME.
APPLICATION FILED JUNE 4, 1914.
1,128,802.
Patented Feb. 16, 1915.
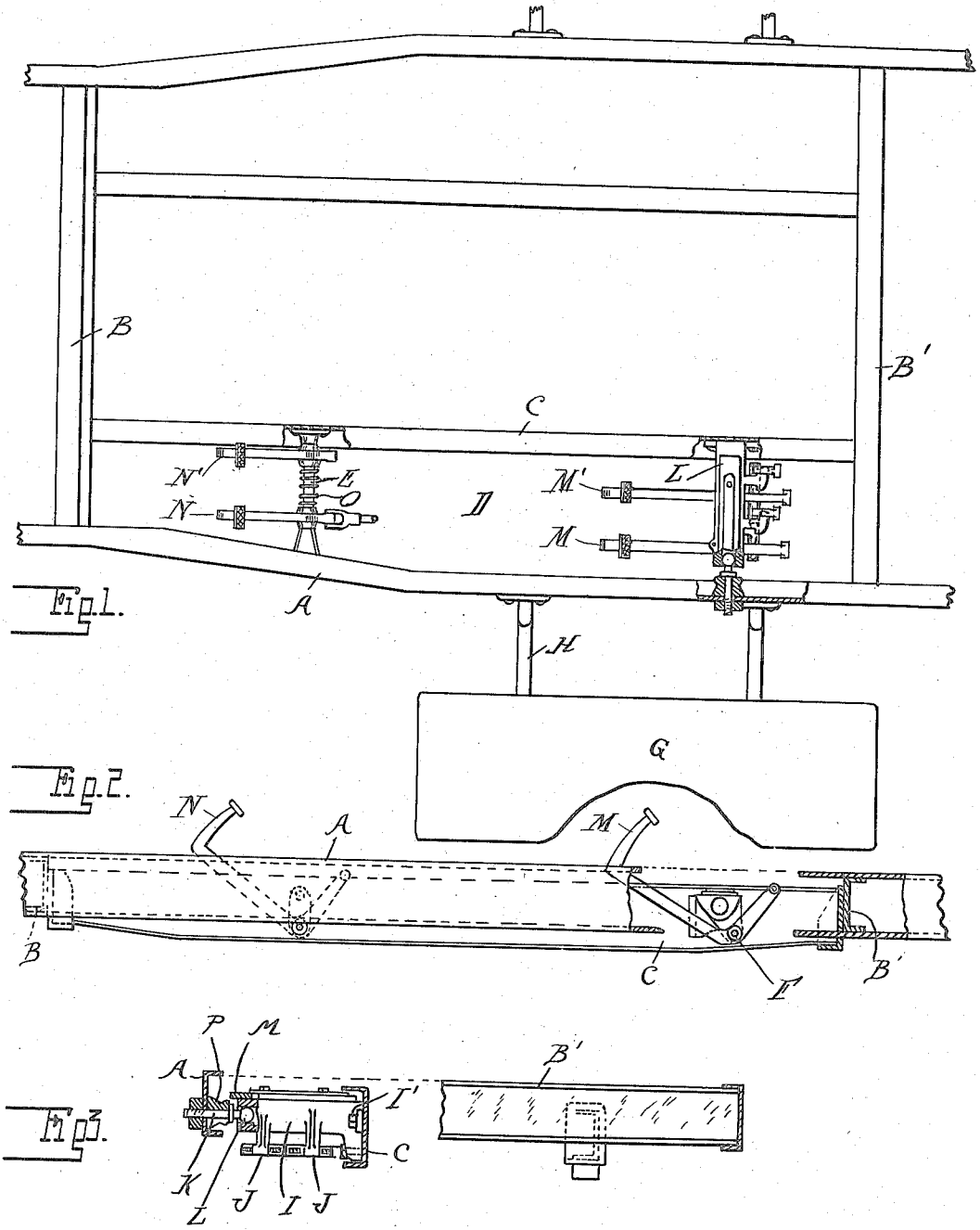
WITNESSES:
W. K. Ford
James P. Barry
INVENTOR
Arthur W. Medhurst
BY
Whittemore Hulbert & Whittemore
ATTORNEYS

UNITED STATES PATENT OFFICE.

ARTHUR W. MEDHURST, OF DETROIT, MICHIGAN, ASSIGNOR TO ANDERSON ELECTRIC CAR COMPANY, OF DETROIT, MICHIGAN, A CORPORATION OF MICHIGAN.

MOTOR-VEHICLE FRAME.

1,128,802.  Specification of Letters Patent.  Patented Feb. 16, 1915.

Application filed June 4, 1914. Serial No. 842,963.

*To all whom it may concern:*

Be it known that I, ARTHUR W. MEDHURST, a subject of the King of Great Britain and Ireland, residing at Detroit, in the county of Wayne and State of Michigan, have invented certain new and useful Improvements in Motor-Vehicle Frames, of which the following is a specification, reference being had therein to the accompanying drawings.

The invention relates to motor vehicle frames of that type in which the motor is carried by a sub-frame having parallel longitudinal bars, which are arranged intermediate the side sills of the main vehicle frame.

It is one of the objects of the invention to utilize this sub-frame in conjunction with one of the side sills of the main frame for the mounting of control mechanism for the vehicle, such for instance as the brake pedals.

It is a further object to make provision for the weaving or twisting of the vehicle frame without the exertion of any detrimental stress upon the control mechanism.

In the drawings: Figure 1 is a plan view of a portion of the vehicle frame; Fig. 2 is a side elevation thereof; and Fig. 3 is a cross section.

A is one of the side sills of the motor vehicle frame, B and B' are cross bars of the frame and C are the side bars of the sub-frame on which the motor is supported. These side bars are preferably supported at their opposite ends by the cross bars B and B' and are arranged so as to leave a space D between the same and the adjacent sill of the main frame. The control mechanism which is mounted upon this frame is preferably of a type in which there are duplicate forward and rear pedals which are controlled respectively from front and rear seats. These pedals are mounted upon shafts extending transversely between the bars A and B and mounted in bearings thereon. Thus, as shown, the shaft E extends between said bars to form the mounting for the forward pedals, and the shaft F forms a similar mounting for the rear pedals.

In use, the main frame of the vehicle is subjected to various stresses from which the sub-frame is relieved. Thus there is the weaving due to the passing of the vehicle over an uneven road bed, and also the torsional stress upon the side sill due to the load on the running board, such as G, which is supported from the side sill by hangers H. These stresses are sufficient to throw any parallel bearing on the side sill which might be used for supporting the shaft F, out of alinement with the complementary bearing upon the bar C, which would result in springing the shaft and interfering with the operation of the pedals. To avoid this result, the shaft F is journaled in a member I, which at one end is secured by bolts I' to the bar C, while its opposite end extends into proximity to the side sill A. This member I has depending bearing lugs J in which the pedal shaft F is journaled, and the rigidity of the member is sufficient to hold said bearings in alinement. To attach the member I to the bar A so as to permit twisting or weaving of the latter under road stress or load upon the foot board G, a universal pivotal connection is provided. This comprises a bolt K which has a spherical head L engageable with a cylindrical recess M in the member I. The bolt is clamped to the web of the sill, and a slotted spacer P is inserted between said web and the spherical head to hold the latter in engagement with the recess. Thus when the side sill is twisted the universal joint will relieve the member I from stress, while at the same time the engagement between the bolt K and the member I will hold the latter against deflection by stresses, due to the operation of the pedals.

A plurality of pedals, such as M M', etc., may be mounted upon the shaft F and corresponding pedals N N', etc., are mounted on the shaft E. The stresses upon the frame adjacent to the latter shaft are not, however, as great as at the point adjacent to the shaft F, and consequently it is merely necessary to provide a slight axial movement of the shaft bearings in relation to each other. Thus the pedals N and N' may be yieldably spaced from each other by the insertion of a spring O sleeved upon the shaft E, so that each pedal is held adjacent to its bearing and is permitted to move axially with respect to the other pedal.

What I claim as my invention is:—

1. In a motor vehicle, the combination with the side sills, of a motor-supporting frame intermediate said side sills including a longitudinally-extending bar, a shaft extending across the space between said side sills and longitudinally extending bar, a supporting bearing for said shaft rigidly attached to said bar, and a universal pivotal connection between the opposite end of said bearing and the side sill permitting independent weaving thereof.

2. In a motor vehicle, the combination with the side sills, of a motor-supporting frame intermediate said side sills including a longitudinally-extending bar, a shaft extending across the space between said bar and side sill, a bearing for supporting said shaft connected at one end to said bar, and a bolt connected to said side sill having a spherical head engaging a socket in the opposite end of said bearing and forming a universal pivotal connection thereto.

3. In a motor vehicle, the combination with the side sills, of a motor-supporting frame including a longitudinally-extending bar intermediate said side sills, forward and rear pedals, shafts upon which said pedals are journaled extending across the space between said side sill and longitudinally-extending bar, a bearing for one of said shafts rigidly connected at one end to said longitudinally-extending bar and pivotally connected at its opposite end to said side sill, bearings for the other shaft secured respectively to said bar and side sill, and a spring sleeved on said shaft intermediate said pedals for holding the same against said bearing.

In testimony whereof I affix my signature in presence of two witnesses.

ARTHUR W. MEDHURST.

Witnesses:
   JAMES P. BARRY,
   HENRIETTA E. BOWMAN.